(12) United States Patent
Streeter et al.

(10) Patent No.: US 11,686,530 B2
(45) Date of Patent: Jun. 27, 2023

(54) PLATE FIN HEAT EXCHANGER FLEXIBLE MANIFOLD

(71) Applicant: Hamilton Sundstrand Corporation, Charlotte, NC (US)

(72) Inventors: James Streeter, Torrington, CT (US); Feng Feng, South Windsor, CT (US); Matthew W. Miller, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 38 days.

(21) Appl. No.: 16/151,988

(22) Filed: Oct. 4, 2018

(65) Prior Publication Data
US 2019/0285349 A1  Sep. 19, 2019

Related U.S. Application Data

(63) Continuation-in-part of application No. 15/923,561, filed on Mar. 16, 2018, now Pat. No. 10,443,959.

(51) Int. Cl.
*F28D 1/047* (2006.01)
*F28F 21/06* (2006.01)
(Continued)

(52) U.S. Cl.
CPC .............. *F28D 1/0476* (2013.01); *B22F 5/10* (2013.01); *B22F 10/28* (2021.01); *B33Y 80/00* (2014.12);
(Continued)

(58) Field of Classification Search
CPC ................. F28D 1/0476; F28D 1/0426; F28D 2021/0021; F28F 21/065; F28F 3/14;
(Continued)

(56) References Cited

U.S. PATENT DOCUMENTS 3,334,399 A * 8/1967 Teeguarden .......... F28D 9/0056
29/890.039
3,525,390 A * 8/1970 Rothman .............. F28D 9/0068
165/166
(Continued)

FOREIGN PATENT DOCUMENTS

DE     19644711 A1    4/1998
EP     1050618 A1 * 11/2000  ............. D06F 58/20
(Continued)

OTHER PUBLICATIONS

EP 1 050 618 A1 mt (Year: 200).*
(Continued)

*Primary Examiner* — Gordon A Jones
(74) *Attorney, Agent, or Firm* — Kinney & Lange, P.A.

(57) ABSTRACT

A flexible manifold adapted for use on a plate-fin heat exchanger core, the flexible manifold including a plurality of individual layers configured to be metallurgically joined to respective ones of a plurality of layers of the plate-fin heat exchanger core, and further including a first end with at least one port adapted to receive or discharge a medium, a second end distal from the first end, adapted to transfer the medium to or from the plurality of individual layers, a plurality of horizontal guide vanes defining the plurality of individual layers, and a plurality vertical members positioned within each of the individual layers. The flexible manifold is configured to be mechanically and thermally compliant, and can be metallurgically joined to the heat exchanger core by brazing or welding.

10 Claims, 9 Drawing Sheets

(51) Int. Cl.
  *F28D 1/04* (2006.01)
  *B33Y 80/00* (2015.01)
  *B22F 5/10* (2006.01)
  *B22F 10/28* (2021.01)
  *F28F 9/02* (2006.01)
  *F28D 21/00* (2006.01)
  *F28F 3/14* (2006.01)
  *B22F 10/32* (2021.01)

(52) U.S. Cl.
  CPC .......... F28D 1/0426 (2013.01); F28F 21/065 (2013.01); *B22F 10/32* (2021.01); *F28D 2021/0021* (2013.01); *F28F 3/14* (2013.01); *F28F 9/0221* (2013.01); *F28F 2255/02* (2013.01)

(58) Field of Classification Search
  CPC ..... F28F 9/0221; F28F 2255/02; B33Y 80/00; B22F 3/1055
  See application file for complete search history.

(56) References Cited

U.S. PATENT DOCUMENTS

| | | | |
|---|---|---|---|
| 3,885,936 A | 5/1975 | Limebeer | |
| 4,336,642 A | 6/1982 | Engelberts | |
| 4,681,155 A * | 7/1987 | Kredo | F28F 3/025 165/76 |
| 8,726,976 B2 | 5/2014 | Schrader et al. | |
| 9,618,278 B2 | 4/2017 | Denkenberger | |
| 9,733,026 B2 * | 8/2017 | Stieger | F28D 9/0037 |
| 10,583,535 B2 * | 3/2020 | Caimano | B23P 15/26 |
| 2004/0261379 A1 | 12/2004 | Brunn et al. | |
| 2008/0041570 A1 * | 2/2008 | Abels | F28F 3/025 165/148 |
| 2013/0232991 A1 | 9/2013 | Otero | |
| 2014/0000841 A1 | 1/2014 | Baker et al. | |
| 2015/0292803 A1 * | 10/2015 | Nyander | B23P 15/26 165/166 |
| 2015/0308750 A1 * | 10/2015 | Rice | F28D 15/0266 165/104.26 |
| 2016/0202003 A1 * | 7/2016 | Gerstler | F28D 9/0012 165/165 |
| 2017/0142980 A1 * | 5/2017 | Hall | A21C 1/1495 |
| 2017/0146305 A1 * | 5/2017 | Kuczek | F28F 9/0256 |
| 2017/0198988 A1 | 7/2017 | Herring | |
| 2017/0211888 A1 | 7/2017 | Schwalm | |
| 2017/0363361 A1 * | 12/2017 | Turney | F28F 9/0202 |

FOREIGN PATENT DOCUMENTS

| | | |
|---|---|---|
| EP | 2565321 A1 | 3/2013 |
| EP | 2980306 A1 | 2/2016 |
| EP | 3410054 A1 | 12/2018 |
| EP | 3514469 A1 | 7/2019 |
| EP | 3540358 A1 | 9/2019 |
| FR | 3016027 A1 | 7/2015 |
| GB | 2560946 A | 10/2018 |

OTHER PUBLICATIONS

European Search Report dated Mar. 13, 2020, received for corresponding European Application No. 19208360.8, 10 pages.
Extended European Search Report dated Jun. 25, 2020, received for corresponding European Application No. 19208360.8, 10 pages.
Extended European Search Report dated Mar. 5, 2020, received for corresponding European Application No. 19199541.4, 6 pages.
"Electron-beam welding," from https://en.wikipedia.org/w/index.php?title=Electron-beam_welding&oldid=84016866"8, 8 pages.
European Search Report dated Apr. 21, 2020, received for corresponding European Application No. 19163199.3, 4 pages.
European Office Action dated Feb. 26, 2020, received for corresponding EP Application No. 19208360.8, 4 pages.
Office Action dated Dec. 2, 2020, received for corresponding U.S. Appl. No. 16/371,392, 11 pages.

* cited by examiner

PLATE FIN HEAT EXCHANGER FLEXIBLE MANIFOLD

CROSS-REFERENCE TO RELATED APPLICATION

This application is a continuation in part of U.S. patent application Ser. No. 15/923,561, entitled "INTEGRAL HEAT EXCHANGER MANIFOLD GUIDE VANES AND SUPPORTS", filed Mar. 16, 2018, which is hereby incorporated by reference in its entirety.

BACKGROUND

The present disclosure relates to heat exchangers, and more particularly, to a plate-fin heat exchanger manifold design that improves the thermal robustness of the plate-fin heat exchanger.

Plate-fin heat exchangers are well known in the aviation arts and in other industries for providing a compact, low-weight, and highly-effective means of exchanging heat from a hot fluid to a cold fluid. Heat exchangers that operate at elevated temperatures, such as those in modern aircraft engines, often have short service lives due to high steady state and cyclic thermal stresses. Inlet and exit manifolds are typically pressure vessels that are welded or bolted at only the exterior perimeter to a heat exchanger core or matrix. Pressure requirements dictate the thickness of these manifolds, usually resulting in a relatively thick header attached to a thin core matrix. This mismatch in thickness and mass, while acceptable for pressure loads, conflicts with the goal of avoiding geometric, stiffness, mass, and material discontinuities to limit thermal stress.

SUMMARY

A flexible manifold adapted for use on a plate-fin heat exchanger core, the flexible manifold having a number of individual layers, and further including a first end with at least one port adapted to receive or discharge a medium, a second end opposite from the first end, adapted to transfer the medium to or from the plurality of individual layers, a number of horizontal guide vanes defining the number of individual layers, and a number vertical members positioned within each of the individual layers. Two adjacent horizontal guide vanes define an individual layer, the individual layers are configured to be metallurgically joined to respective ones of the layers of the plate-fin heat exchanger core, and the flexible manifold is configured to be mechanically and thermally compliant.

A method of forming a plate-fin heat exchanger having a heat exchanger core and at least one flexible manifold, the method includes forming the heat exchanger core, having a number of individual core layers, and metallurgically joining each of the individual layers of at least one flexible manifold to respective ones of the plurality the individual core layers, thereby metallurgically joining at least one flexible manifold to the heat exchanger core.

A plate-fin heat exchanger includes a plate-fin heat exchanger core and a flexible manifold adapted for use on the plate-fin heat exchanger core. The flexible manifold includes a number of individual layers, and further including a first end with at least one port adapted to receive or discharge a medium, a second end opposite from the first end, adapted to transfer the medium to or from each of the individual layers, a number of horizontal guide vanes defining the plurality of individual layers, and a number of vertical members disposed within each of the individual layers. The individual layers are configured to be metallurgically joined to respective ones of the layers of the plate-fin heat exchanger core, and the flexible manifold is configured to be mechanically and thermally compliant.

DETAILED DESCRIPTION

Figure 1A:
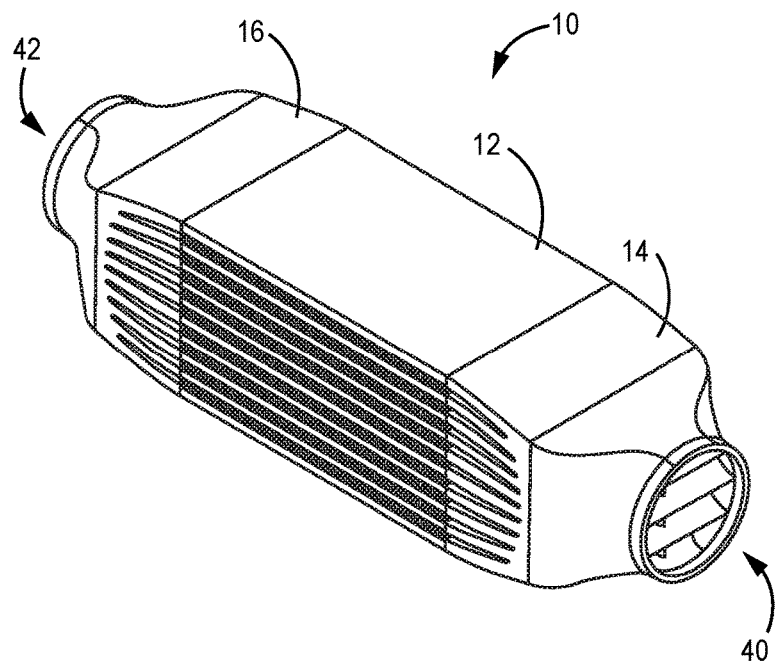
FIG. 1A is a perspective view of a plate-fin heat exchanger core with a hot layer inlet and outlet flexible manifolds.

FIG. 1A is a perspective view of a plate-fin heat exchanger core showing the hot layer inlet and outlet manifolds. Shown in FIG. 1A are heat exchanger 10, heat exchanger core 12, first hot manifold 14, second hot manifold 16, hot inlet 40, and hot outlet 42. Heat exchanger 10 includes heat exchanger core 12, where heat can be transferred from a hot medium (not shown) to a cold medium (not shown), while separating the hot medium from the cold medium. Accordingly, heat exchanger 10 includes a hot circuit (not shown) and a cold circuit (not shown). The hot and cold mediums can be a fluid, either or both being a liquid, gas, and/or a mixture of liquid and gas. The hot and/or cold mediums can change phase in or near heat exchanger 10. The hot and/or cold mediums can entrain particles. As used in this disclosure, the hot and/or cold mediums can be referred to as fluids.

The hot medium can be called a first medium, and the cold medium can be called a second medium. Accordingly, the hot circuit can be called a first circuit, and the cold circuit can be called a second circuit. The hot medium enters first hot manifold 14 at hot inlet 40, flows through heat exchanger core 12, and exits through second hot manifold 16 at hot outlet 42. Heat exchanger 10 can also include a first and second cold manifold (not shown) for directing the cold circuit. Heat exchanger 10 depicted in FIG. 1A is a cross-flow heat exchanger, because flow through the hot flow circuit is generally across flow through the cold flow circuit (i.e., the direction of hot flow through the heat exchanger core is generally perpendicular to the direction of cold flow through the heat exchanger core). The flow configuration can be different in other embodiments. Moreover, in other embodiments, more than one hot inlet 40 and/or hot outlet 42 can exist.

Figure 1B:
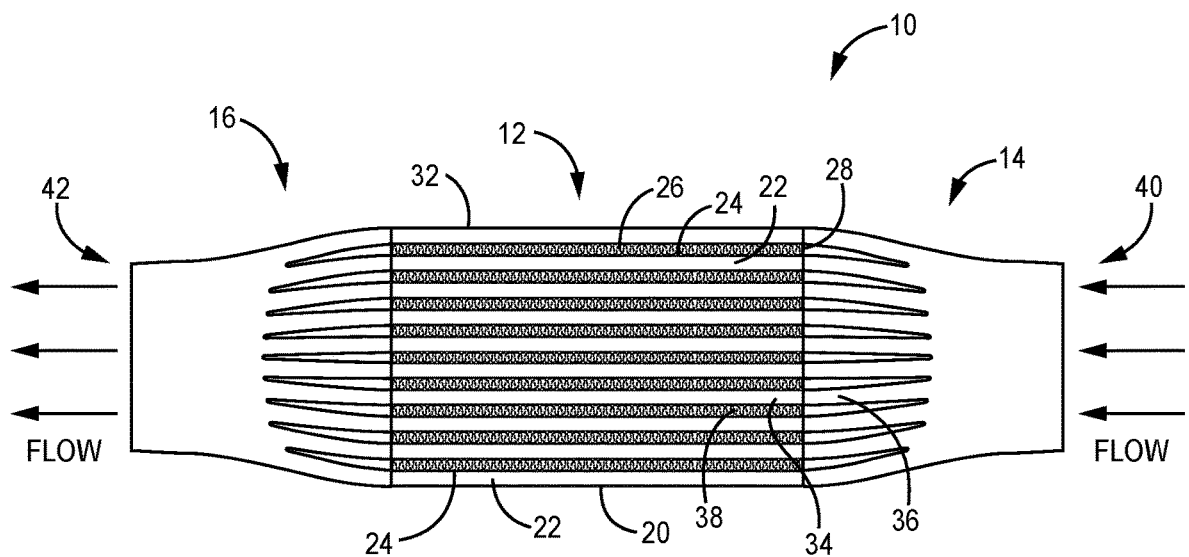
FIG. 1B is a side view of the plate-fin heat exchanger core with the hot layer inlet and outlet flexible manifolds shown in FIG. 1A.

FIG. 1B is a side view of the plate-fin heat exchanger core of FIG. 1A. Shown is FIG. 1B are heat exchanger 10, heat exchanger core 12, first hot manifold 14, second hot manifold 16, bottom end sheet 20, hot closure bars 22, parting sheets 24, cold fins 26, cold closure bars 28, top end sheet 32, hot layers 34, individual layers 36, cold layers 38, hot inlet 40, and hot outlet 42. As described above with respect to FIG. 1A, the hot medium (not shown) enters first hot manifold 14 at hot inlet 40. The hot medium is directed via individual layers 36 into heat exchanger core hot layers 34, then recombines in second hot manifold 16 and exits via hot outlet 42. Alternating hot layers 34 and cold layers 38 are sandwiched between bottom end sheet 20 and top end sheet 32. Hot fins (not shown) channel the flow of the hot medium with boundaries defined by hot closure bars 22 on either side of each hot layer, and parting sheets 24 on the top and bottom of each layer. Similarly, cold fins 26 channel the flow of the cold medium with boundaries defined by cold closure bars 28 on either side of each cold layer, and parting sheets 24 on the top and bottom of each layer. In the illustrated embodiment, ten hot layers and nine cold layers are used. In other embodiments, there can be practically any number of hot layers and/or cold layers. First and second hot manifolds 14, 16 can be called flexible manifolds because they are thermally and mechanically compliant.

Figure 2:
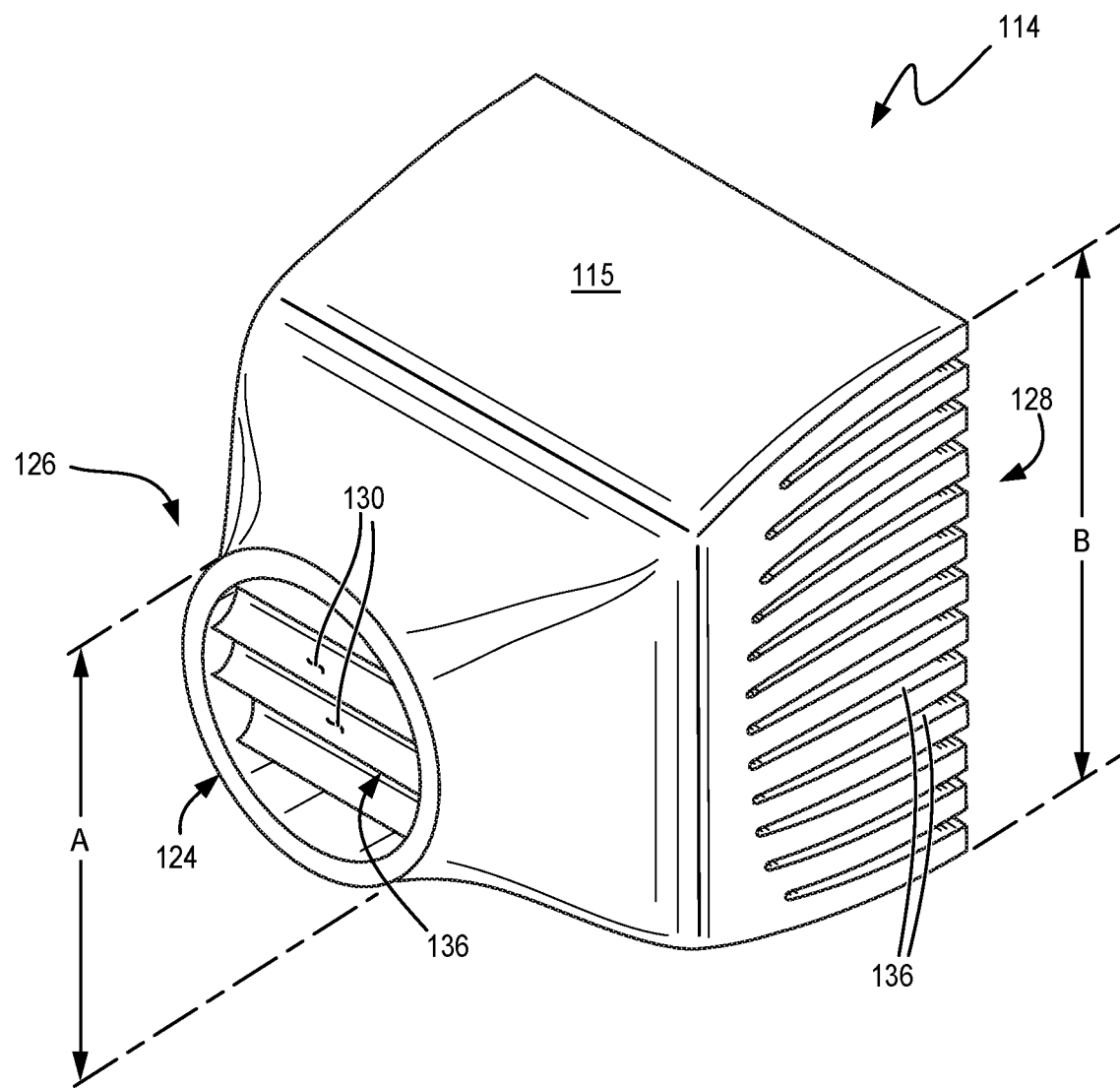
FIG. 2 is a perspective view of a second embodiment of a flexible manifold.
Figure 3A:
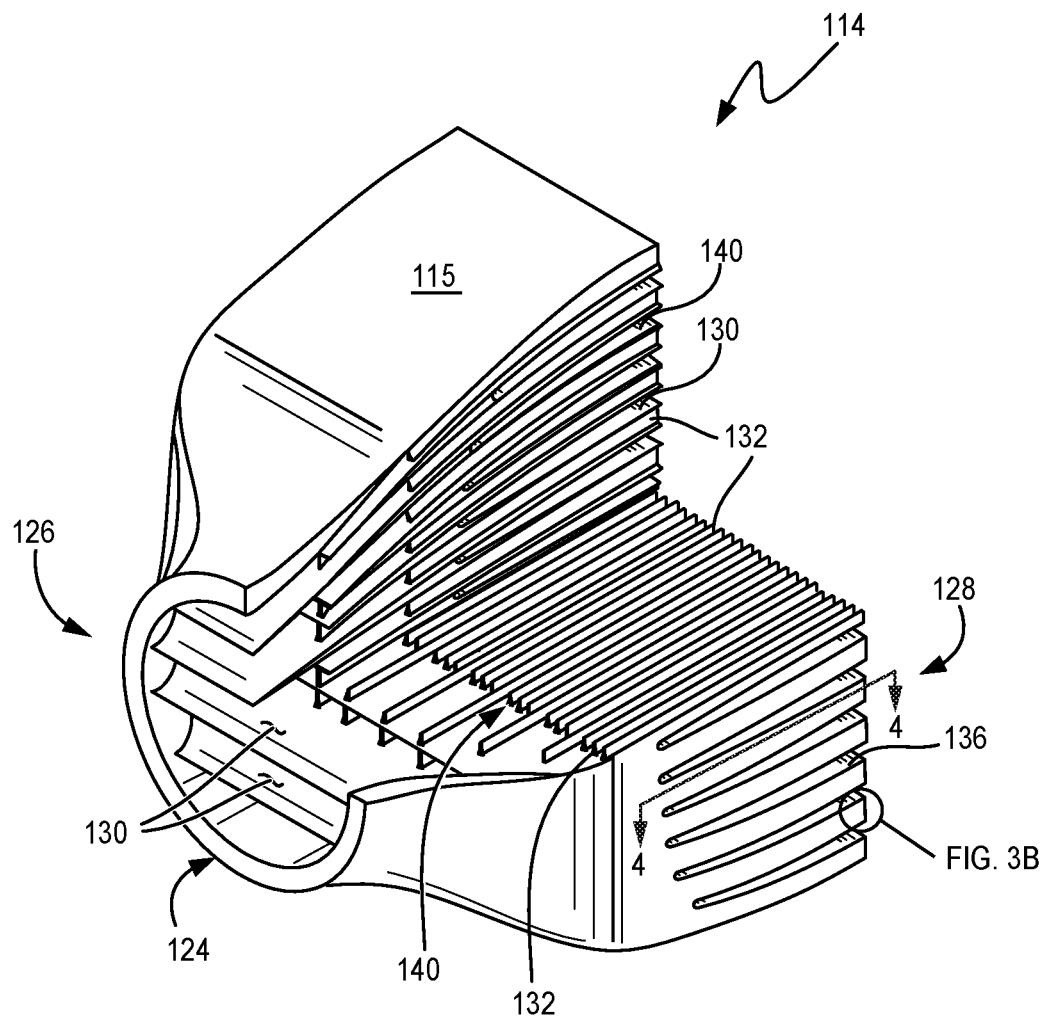
FIG. 3A is a quarter cut-away perspective view of the flexible manifold shown in FIG. 2.
Figure 3B:
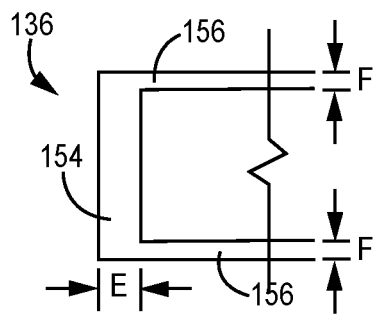
FIG. 3B is an end view of a portion of an individual layer of the flexible manifold shown in FIG. 3A.

FIG. 2 is a perspective view of a second embodiment of the flexible manifold. FIG. 3A is a quarter cut-away perspective view of the flexible manifold of FIG. 2. FIG. 3B is an end view of a portion of an individual layer of the flexible manifold shown in FIG. 3A. Shown in FIGS. 2 and 3A-3B are flexible manifold 114, housing 115, port 124, first end 126, second end 128, horizontal guide vanes 130, vertical guide vanes 132, individual layers 136, discrete manifold flow passages 140, side wall second end region 154, and floor second end region 156. Accordingly, as used herein, floor second end region 156 refers to both the lower and upper horizontal sections of each individual layer 136, and can also be referred to as "floor". Moreover, as used herein, the terms "vertical" and "horizontal" are relative to a standard upright orientation of the heat exchanger, and they do not necessarily imply these guide vanes have specific orientations relative to gravity or the placement and/or orientation of the heat exchanger. Moreover, these terms do not necessarily require, unless specifically stated, that the vanes are exactly perpendicular to one another at some or all points. Accordingly, horizontal guide vanes 130 can be called first guide vanes, and vertical guide vanes 132 can be called second guide vanes.

A plurality of horizontal guide vanes 130 extending at least part of a distance from the first end 126 to the second end 128 of flexible manifold 114, or vice versa, define individual layers 136 for at least one medium (e.g., the hot medium in FIGS. 1A-1B). Together with horizontal guide vanes 130, a plurality of vertical guide vanes 132, formed at a nonzero angle to horizontal guide vanes 130, can divide ones of the individual layers 136 into a plurality of first discrete manifold flow passages 140 extending at least part of a distance from the first end 126 to the second end 128 of flexible manifold 114, or vice versa. In some embodiments, vertical guide vanes 132 can make an angle that is near 90 deg. to horizontal guide vanes 130. Direction of flow would depend on whether flexible manifold 114 is serving as an inlet manifold or an outlet manifold.

Individual layers 136 of flexible manifold 114 can be formed as gradual transitions (i.e., continuous, homogeneous transitions) from first end 126 to second end 128 to reduce or eliminate discontinuities that otherwise in conventional designs can cause high stress to the heat exchanger core (not shown), which can lead to an abbreviated service life. Rather, in the present design, the plurality of horizontal vanes 130 and thus individual layers 136 are cantilevered and flexible to allow for elastic deformation from media flowing through the manifold passages. As shown, first end 126 can include an opening or port 124 of size A (sized for coupling to a duct, pipe, or the like to receive the first medium 120) that is smaller than a size B of second end 128 at a manifold/core interface (e.g., heat exchanger core 12 in FIGS. 1A-1B). Size A can be a diameter of port 124. Size B can be a height of an opening at second end 128. Size B can also correspond to the cumulative area of the opening at second end 128. Depicted in FIG. 3B is a portion of individual layer 136 as viewed from second end 128 showing side wall second end region 154 and floor second end region 156. With reference to individual layers 136, side wall second end region 154 can be referred to as the sidewalls, and floor second end regions 156 can be referred to as the floors. In the illustrated embodiment, "floor" refers to both the upper and lower floor second end regions 156 of individual layer 136. Side wall second end region 154 has thickness E, and floor second end region 156 has thickness F, as shown in FIG. 3B.

Flexible manifold 114 can be formed by additive manufacturing, hybrid additive subtractive manufacturing, subtractive manufacturing, and/or casting, for example. Embodiments of flexible manifolds 114 described herein can leverage additive manufacturing or any other manufacturing method or methods (e.g., casting) that allows one to construct continuous, homogeneous transitions between the heat exchanger core 114 and one or more flexible manifolds 113. Additive manufacturing is also useful in building and tailoring vertical guide vanes 132 within flexible manifolds 114. As horizontal guide vanes 130 reduce discontinuities in material properties and thermal expansion between flexible manifold 114 and heat exchanger core 12, vertical guide vanes 132 provide stiffness and support to withstand the pressure of medium(s) flowing through flexible manifold 114 (where welds or bolted flanges are required in conventional heat exchangers). Accordingly, a method of the present disclosure includes forming heat exchanger core 12 for heat exchanger 10 and additively manufacturing a first flexible manifold 114 for heat exchanger 10. Forming a first flexible manifold 114 includes additively building housing 115 for first flexible manifold 114. Within housing 115, a plurality of horizontal guide vanes 130 are additively built, defining individual layers 136 for the first medium. A plurality of vertical guide vanes 132 can also be additively built, dividing ones of individual layers 136 into a plurality of discrete manifold flow passages 140.

In an exemplary embodiment, powder bed fusion can be used as an additive manufacturing process to fabricate flexible manifold 114 from metallic materials. Non-limiting examples of metallic materials that can be used include nickel, aluminum, titanium, copper, iron, cobalt, and all alloys that include these various metals. In some embodiments, various alloys of INCONEL™ can be used to fabricate flexible manifold 114, with Inconel 625 and Inconel 718 being two exemplary alloy formulations. In other embodiments, HAYNES™ 282 can be used in fabricating flexible manifold 114. In yet other embodiments, alloys of aluminum can be used in fabricating to flexible manifold 114. For example, an alloy of aluminum known as AlSi10Mg can be used in fabricating flexible manifold 114. All materials that include metals, metal oxides, and alloys thereof in fabricating flexible manifold 114 are within the scope of the present disclosure.

Figure 4:
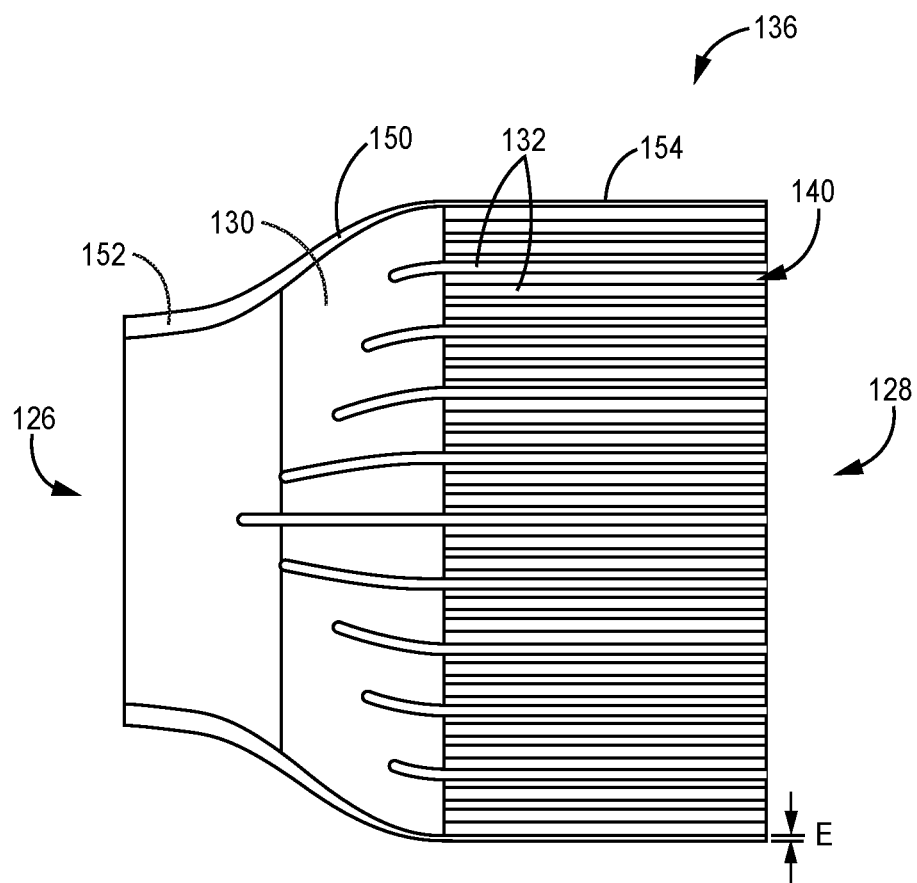
FIG. 4 is a top cross-sectional view of a layer of the flexible manifold shown in FIG. 2.

FIG. 4 is a top cross-sectional view taken at cut-line 4-4 of layer 136 of flexible manifold 114 shown in FIG. 3. Shown in FIG. 4 are first end 126, second end 128, horizontal guide vane 130, vertical guide vanes 132, individual layer 136, discrete manifold flow passage 140, side wall 150, side wall first end region 152, and side wall second end region 154. The medium flowing through individual layer 136 is contained by horizontal guide vanes 130 which form the top and bottom pressure boundaries of individual layer 136, and by side walls 150 which form the side pressure boundaries of individual layer 136. Vertical guide vanes 132 direct the flow through individual layer 136, thereby forming discrete manifold flow passages 140. Each side wall 150 has side wall first end region 152 and side wall second end region 154. The thickness of side wall 150 generally tapers from a greater thickness at side wall first end region 152 (corresponding to first end 126) to a smaller thickness at side wall second end region 154 (corresponding to second end 128). In the vicinity of second end 128, side wall 150 has second end side wall thickness E as shown in FIG. 4. Vertical guide vanes 132 connect from lower horizontal guide vane 130 to the upper guide vane 130 in each individual layer 136, thereby helping provide structural support for individual layers 136. In a particular embodiment, flexible manifold 114 can be used in an application where the medium has a pressure as high as 1,000 psi (6,895 KPa). Accordingly, vertical guide vanes 132 can assist in limiting or preventing individual layers 136 from deforming under the working pressure of the medium, thereby enhancing the mechanical compliancy of flexible manifold 114. Vertical guide vanes 132 can also be referred to as vertical members.

In the illustrated embodiment, second end side wall thickness E can be equal to the thickness of hot closure bars 22 as shown in FIG. 1B. In these embodiments, side walls 150 are metallurgically joined at side wall second end region 154 to hot closure bars 22, thereby partially joining flexible manifold 114 (shown in FIGS. 2-3) to a heat exchanger core. Accordingly, in these particular embodiments, the mechanical and/or thermal flexibility of flexible manifold 114 can be enhanced by the selection of thickness E of sidewall second end region 154 and thickness E of hot closure bar 22. In the illustrated embodiment, hot closure bars 22 can have a thickness that is equal to second end side wall thickness E. In other embodiments, hot closure bars 22 can have a thickness that is either greater than or less than second end side wall thickness E.

In the embodiment illustrated in FIG. 4, flexible manifold 114 can be an inlet manifold, whereby the flow of a medium can enter individual layer at first end 126 and exit at second end 128 where it can enter a heat exchanger core as described with regard to FIGS. 2-3. In another embodiment, flexible manifold 114 can be an outlet manifold, with medium flow occurring in the opposite direction as described.

Figure 5A:
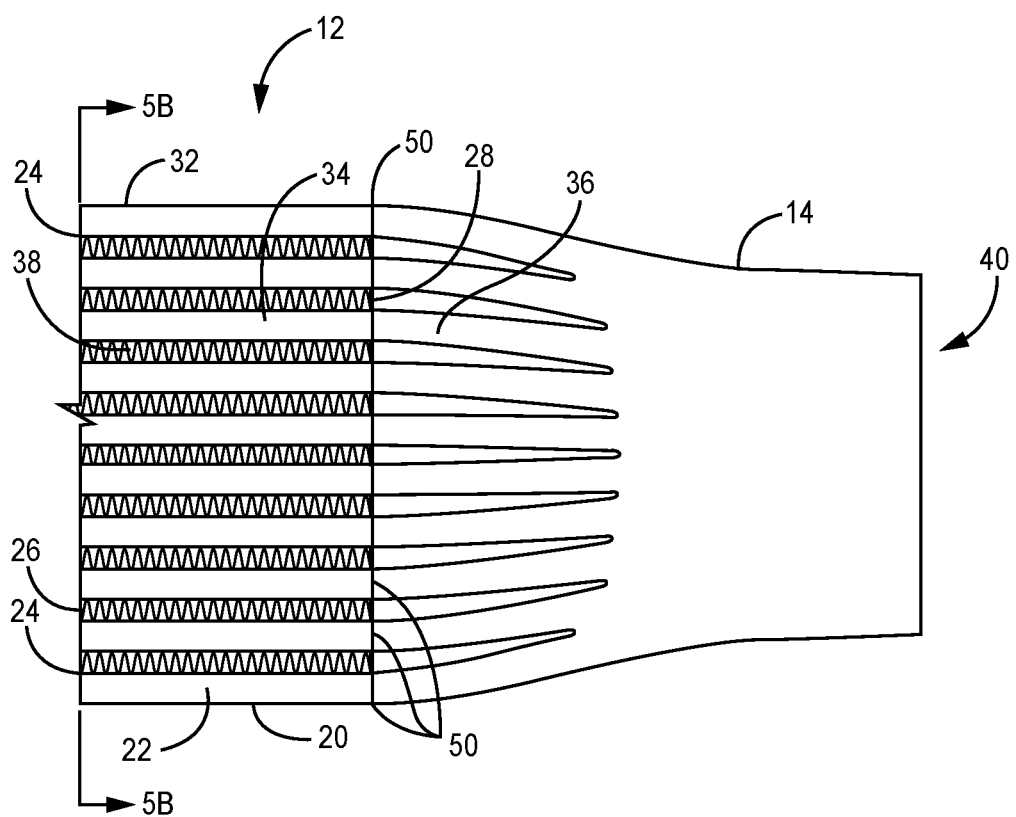
FIG. 5A is a side view of a portion of the plate-fin heat exchanger core with a first hot manifold.
Figure 5B:
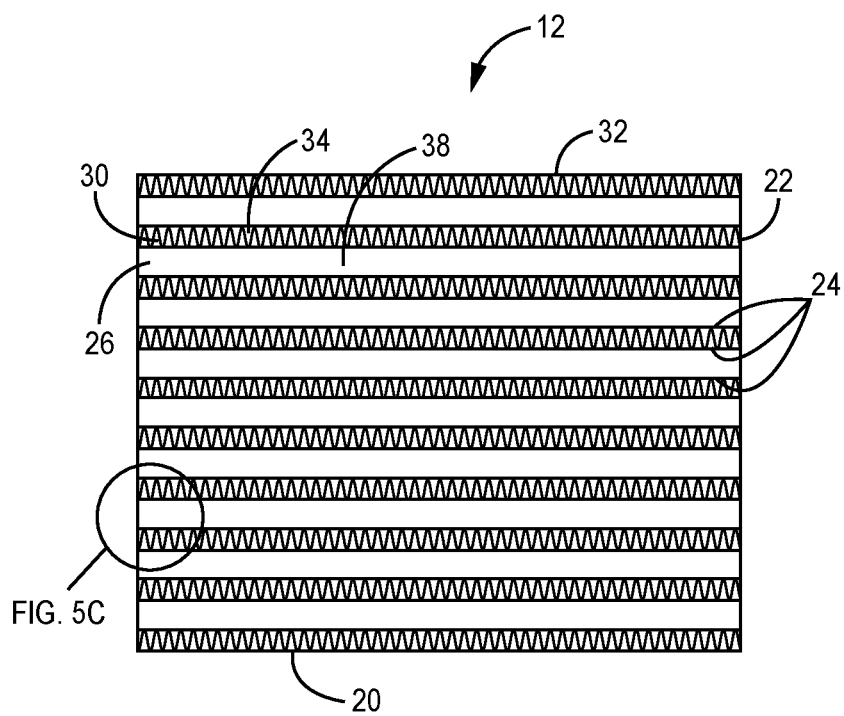
FIG. 5B is a cross-sectional end view of the heat exchanger core of FIG. 5A.
Figure 5C:
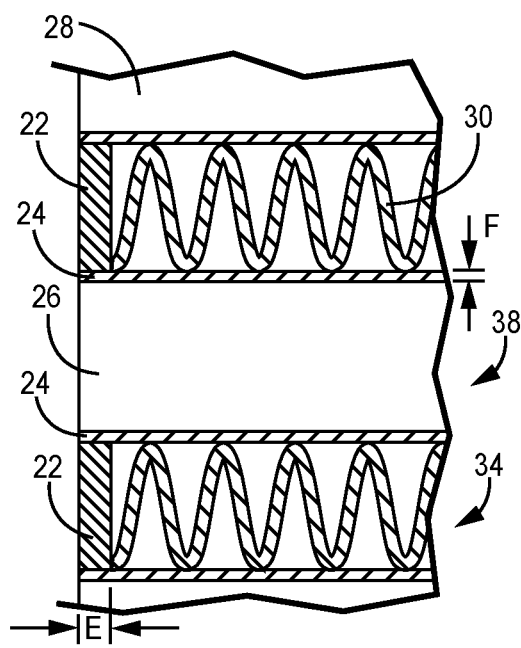
FIG. 5C is an enlarged section of the heat exchanger core of FIG. 5B.

FIG. 5A is a side view of a portion of plate-fin heat exchanger core 12 with first hot manifold 14 as shown in FIG. 1B. FIG. 5B is a cross-sectional end view of the heat exchanger core of FIG. 5A, and FIG. 5C is an enlarged section of the heat exchanger core of FIG. 5B. Shown in FIGS. 5A-5C are heat exchanger core 12, first hot manifold 14, bottom end sheet 20, hot closure bars 22, parting sheets 24, cold fins 26, top end sheet 32, hot layers 34, individual layers 36, cold layers 38, hot inlet 40, and metallurgical bonds 50. The description of FIGS. 5A-5C are substantially the same as that provided above with regard to FIG. 1B. Additionally shown in FIG. 5A are metallurgical bonds 50 joining each individual layer 36 to the respective hot closure bars 22 and parting sheets 24 of heat exchanger core 12. Similarly, metallurgical bonds 50 join each individual layer 36 of hot outlet (not shown) to the respective hot closure bars 22 and parting sheets 24 of heat exchanger core 12. Referring to FIG. 5C, each hot layer 34 includes hot fin 30, hot closure bars 22 on the left and right, and parting sheets 24 on the top and bottom. Similarly, each cold layer 38 includes cold fins 26, cold closure bars 28 on the front and back (not shown), and parting sheets 24 on the top and bottom. Generally, a particular parting sheet 24 is shared by an adjacent hot layer 34 and cold layer 38. Hot closure bar 22 has thickness E, and parting sheet 24 has thickness F. Each individual layer 36 includes side walls 150 and individual layer floors (not shown in FIG. 5A), with the side walls being the outer vertical portions of individual layer 36 and the individual layer floors being the upper and lower horizontal portions of individual layers 36. Accordingly, as used herein, "floor" refers to both the lower and upper horizontal sections of each individual layer 36. Therefore, metallurgical bonds 50 exist between the side walls and closure bars 22, and between the individual layer floors and parting sheets 24 on first hot manifold 14 and on the second hot manifold (not shown in FIG. 5A).

In the illustrated embodiment, floor thickness F (as shown in FIG. 3B) can be equal to thickness F of parting sheet 24 (as shown in FIG. 5C). In these embodiments, individual floors are metallurgically joined to parting sheets 24, thereby partially joining flexible manifold 114 to heat exchanger core 12. Accordingly, by providing the floor thickness F equal to thickness F of parting sheet 24, the mechanical and/or thermal flexibility of flexible manifold 114 can be enhanced. This can be referred to as being mechanically and thermally compliant, in which flexible manifold 114 is able to withstand temperature and/or pressure changes and/or transients. In some embodiments, the floor thickness can be greater than or less than the thickness of parting sheet 24, which still contributing to the mechanical and/or thermal compliancy of flexible manifold 114.

Metallurgical bonds 50 can be created by one of several metal bonding processes, with non-limiting examples including brazing and welding. In the embodiment illustrated in FIG. 5A, metallurgical bonds 50 are formed as butt joints, whereby each hot layer 34 abuts each corresponding individual layer 36. In the illustrated embodiment of the butt joint shown in FIG. 5A, welding can be used to join each hot layer 34 to a corresponding individual layer 36. Exemplary welding methods that can be used include electron-beam welding and laser welding, and these will be described in more detail in FIG. 8. All other forms of welding are within the scope of the present disclosure. In other embodiments, metallurgical bonds 50 can be formed by brazing. The foregoing description pertains to the joining of hot manifolds to heat exchanger core 12. In a typical embodiment, cold manifolds (not shown) can be joined to heat exchanger core 12 by using a similar metal bonding process.

Figure 6:
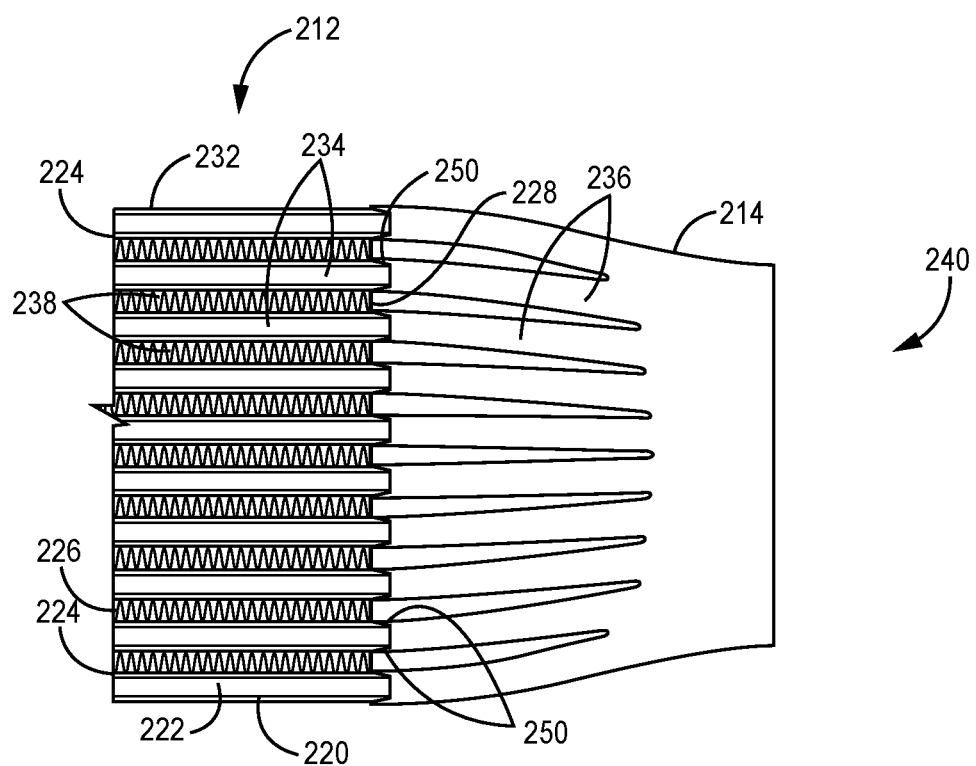
FIG. 6 is a side view of a portion of a second embodiment of the plate-fin heat exchanger core with a first hot manifold.

FIG. 6 is an enlarged side view of a second embodiment of plate-fin heat exchanger core 212 with first hot manifold 214. FIG. 6 shown in FIG. 6 are heat exchanger core 212, first hot manifold 214, bottom end sheet 220, hot closure bars 222, parting sheets 224, cold fins 226, cold closure bars 228, top end sheet 232, hot layers 234, individual layers 236, cold layers 238, hot inlet 240, and metallurgical bonds 250. The description of FIG. 6 is substantially the same as that provided above with regard to FIG. 5A, with the exception that metallurgical bonds 250 are formed as lap joints, whereby each hot layer 234 partially enters each corresponding individual layer 236. In the illustrated embodiment of the lap joint shown in FIG. 6, brazing can be used to join each hot layer 234 to a corresponding individual layer 236. In an exemplary lap joint brazing process, the manifold-facing portions of each hot layer 234 are coated with a brazing material. During the brazing process, the coated brazing material on each hot layer 234 melts, forming a metallurgical bond with each corresponding individual layer 236. The brazing process that forms metallurgical bonds 250 will be described in more detail in FIG. 7. In other embodiments, metallurgical bonds 250 can be formed by welding. The foregoing description pertains to the joining of first hot manifold 214 and a second hot manifold (not shown) to heat exchanger core 212. In a typical embodiment, cold manifolds (not shown) can be joined to heat exchanger core 212 by using a similar metal bonding process.

Figure 7:
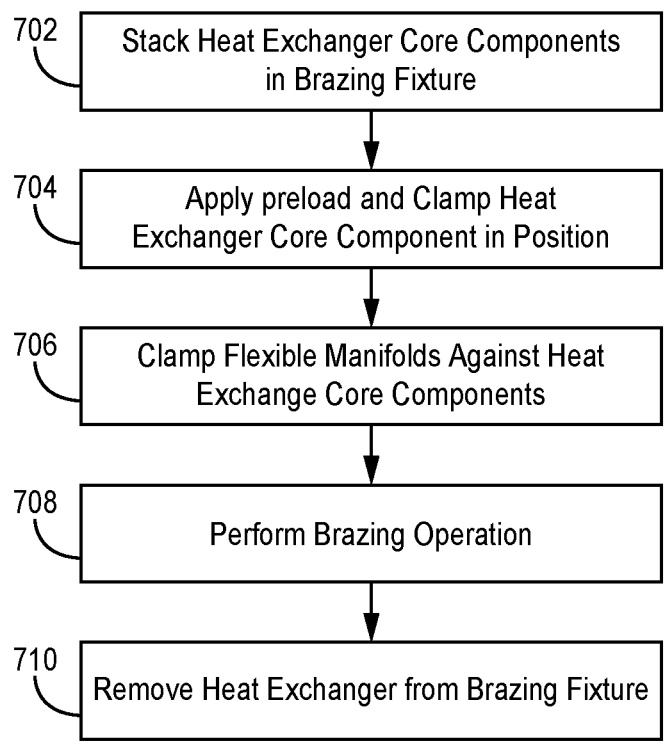
FIG. 7 is a flow chart depicting a process steps for brazing the flexible manifolds to the heat exchanger core.

FIG. 7 is a flow chart depicting exemplary process steps for brazing flexible manifolds (i.e., first hot manifold 214, second hot manifold, first and second cold manifolds) to heat exchanger core 212 as shown in FIG. 6. Shown in FIG. 7 are the following process steps: stack core components step 702, clamp core components step 704, clamp flexible manifold step 706, brazing operation step 708, and remove heat exchanger step 710. In the process shown in FIG. 7, flexible manifolds are brazed to heat exchanger core 212 as a bulk process occurring during the brazing of heat exchanger core 212.

Brazing is a method that can be used to metallurgically join one or more flexible manifolds to a heat exchanger core. The process depicted in FIG. 7 can be used to form metallurgical bonds 250 as were shown in FIG. 6. In the illustrated embodiment, assembly of heat exchanger core begins with stack core components step 702 in which the various components that will become the heat exchanger core are stacked together in a brazing fixture. These various components can be coated with a brazing material which, after melting, forms metallurgical bonds between the various components.

Next, in clamp core components step 704, a preload force is applied to the heat exchanger core components which are then clamped into position. For example, the preload force can partially compress the various hot and cold fins to establish the proper dimensions of the completed heat exchanger core while also ensuring proper contact exists between the various hot and cold fins and the bottom end sheet, parting sheets, and top end sheet. Next, in clamp flexible manifold step 706, the flexible manifolds that comprise the finished heat exchanger are positioned and clamped into position against the heat exchanger core components. There can be overlapping engagement of hot layers 234 and individual layers 236, in which each hot layer 234 matingly engages with a respective individual layer 236 as shown in FIG. 6, thereby forming a lap joint.

The foregoing description of FIGS. 1A-1B focused primarily on the hot circuit of heat exchanger 10. In the embodiment shown in FIGS. 1A-1B, the cold circuit also includes cold manifolds (not shown) that are substantially similar to hot manifolds 216. Accordingly, clamp flexible manifold step 706 can include positioning and clamping flexible manifolds for the hot and cold circuits (i.e., first and second hot manifolds, first and second cold manifolds).

Next, the heat exchanger core components and flexible manifolds are metallurgically joined in perform brazing operation step 708. In an exemplary manufacturing process, the brazing fixture that holds the heat exchanger core components and flexible manifolds is placed into a brazing furnace. Brazing furnaces are known to those who are skilled in the plate-fin heat exchanger arts. An exemplary brazing process can include evacuating the air from the brazing furnace so that the stacked heat exchanger core components are in a vacuum. Next, the temperature in the brazing furnace is increased to at least the brazing melt temperature and held for a period of time to allow the brazing material to melt and flow. The brazing furnace temperature is then lowered, thereby allowing the brazing material to solidify, and the brazing furnace can be back-filled by an inert gas. An annealing cycle can also be performed in some embodiments.

The final step shown in FIG. 7 is remove heat exchanger step 710, in which the metallurgically-joined heat exchanger core 212 and the flexible manifolds (i.e., the heat exchanger) is removed from the brazing furnace. This step can include removing the heat exchanger from the brazing fixture, after which additional process steps can be performed. For example, in some embodiments, inspection and testing of the heat exchanger is performed to assure the completeness of the metallurgical joining process. For the purpose of this discussion, a metallurgically-joined heat exchanger core and one or more flexible manifolds can be referred to as a heat exchanger without regard to the completeness of the heat exchanger. It is to be recognized that a fully complete heat exchanger will include a heat exchanger core metallutgically-joined to all hot and cold manifolds for which the heat exchanger is designed.

In the embodiment illustrated in FIG. 7, perform brazing operation step 708 included brazing the heat exchanger core components and the flexible manifolds in one step. In another embodiment, the heat exchanger core can be brazed in a first brazing step, and then the flexible manifolds can be metallurgically joined to the heat exchanger core in a second brazing step.

Figure 8:
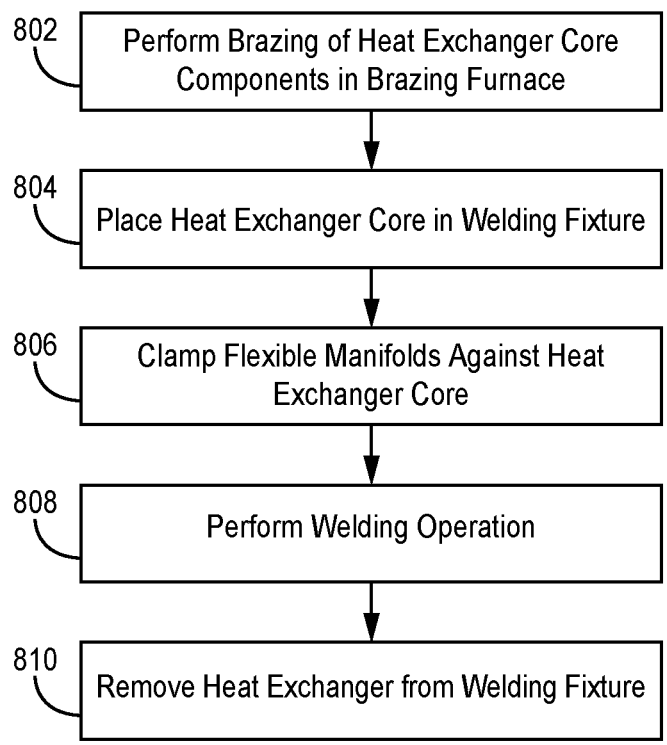
FIG. 8 is a flow chart depicting a process steps for welding the flexible manifolds to the heat exchanger core.

FIG. 8 is a flow chart depicting exemplary process steps for welding the flexible manifolds to the heat exchanger core. Welding is a method that can be used to metallurgically join one or more flexible manifolds to a heat exchanger core. As described earlier with regard to FIG. 5A, all welding processes are within the scope of the present application. Non-limiting exemplary welding processes are electron beam welding and laser welding. The flow chart depicted in FIG. 8 follows similar process steps to those depicted in FIG. 7, with the significant difference being that welding is used to form metallurgical joints 50 as shown in FIG. 5A. Shown in FIG. 8 are the following process steps: brazing operation step 802, position in welding fixture step 804, clamp flexible manifold step 806, welding operation step 808, and remove heat exchanger step 810. In the process shown in FIG. 8, the various components that will become the heat exchanger core are stacked together in a brazing fixture. These various components can be coated with a brazing material which, after melting, forms metallurgical bonds between the various components. A preload force can be applied to the heat exchanger core components which are then clamped into position, similar to the process described above with regard to FIG. 7. The heat exchanger core components are then placed in a brazing furnace, and the brazing operation is performed. In the illustrated embodiment, the brazing of the heat exchanger core can be substantially similar to the process described above in regard to FIG. 7, with the exception that the heat exchanger core is brazed without the flexible manifolds. Next, after removing the brazed heat exchanger core from the brazing furnace, position in welding fixture step 804 is performed to position the heat exchanger core in a fixture that will accommodate a welding operation. Next, clamp flexible manifold step 806 can include positioning and clamping flexible manifolds for the hot and cold circuits (i.e., first and second hot manifolds, and also first and second cold manifolds) against the heat exchanger core. In some embodiments, a machining step can be performed prior to clamp flexible manifold step 806 to assist in providing a proper mechanical fit and/or dimensional tolerances between heat exchanger core 212 and the flexible manifolds.

Next, the flexible manifolds are metallurgically joined to the heat exchanger core in welding operation step 808. Electron beam welding (EBW) and laser welding are fusion metallurgical joining processes that can produce a weld zone joining each of the individual layers of a respective flexible manifold to the corresponding layers of the heat exchanger core, with EBW and laser welding being known to those skilled in the metallurgical joining arts. In a first embodiment, EBW can be used as a welding process by which electrons are accelerated to a high energy and directed as a beam to the region to be welded whereby metal fusion occurs. In a typical embodiment, EBW can be performed in a vacuum or near-vacuum. In other embodiments, EBW can be performed in an inert atmosphere. Argon gas is an example of an inert atmosphere that can be used in the vicinity of the weld. In yet other embodiments, EBW can occur in air, in a rarefied atmosphere, or in a partial vacuum.

In an exemplary embodiment, a single electron beam is progressively directed at all areas to be welded in welding operation step 808. That is, each individual layer of each flexible manifold is sequentially welded to each corresponding layer of a heat exchanger core. In another embodiment, multiple electron beams can be used, either acting on multiple individual layers and/or multiple regions of an individual layer simultaneously to each other. One advantage of using multiple electron beams can be to shorten the overall time taken to complete welding operation step 808.

In a second embodiment of welding operation step 808, a laser can be used to provide a high-power laser beam that produces the metallurgical bond. A laser beam can be directed at the region to be welded, whereby metal fusion occurs. The description of laser welding is similar to the foregoing description of EBW with regard to the use of a single or multiple laser beams as well as the atmosphere or vacuum of the weld environment.

In the exemplary embodiment depicted in FIG. 8, all flexible manifolds can be joined to the heat exchanger core in welding operation step 808, with the total number of flexible manifolds being determined by the particular design of a heat exchanger. In other embodiments, one or more flexible manifolds can be joined to the heat exchanger core in welding operation step 808.

Next, in remove heat exchanger step 810, the heat exchanger is removed from the welding chamber and from the welding fixture that held the flexible manifolds in position against the heat exchanger core. Additional process steps can be performed. For example, in some embodiments, inspection and testing of the heat exchanger is performed to assure the completeness of the metallurgical joining process.

In some embodiments, multiple flexible manifolds can be joined to the heat exchanger core at one time in welding operation step 808. In other embodiments, only a single flexible manifold can be joined to exchanger core in welding operation step 808. In these other embodiments, process steps will be repeated in order to complete the welding of all flexible manifolds to a heat exchanger core. For example, in an embodiment where fewer than all flexible manifolds are welded to a heat exchanger core in welding operation step 808, then clamp flexible manifold step 806, welding operation step 808, and remove heat exchanger step 810 can be repeated as necessary.

As used in this disclosure, the terms "high-energy" and "high-power" are used to describe an electron beam and/or laser beam by implying that the beam is capable of fusing metal during welding operation step 808. It is to be appreciated that power is a rate of delivering energy, and that the energy level and/or power of the particular beam is configured to produce the metallurgical joining of a flexible manifold to a heat exchanger core. In a particular embodiment several factors can be considered in the selection of the power level of the welding beam including, for example, the energy level of the electrons or the wavelength of the laser.

Welding processes other than EBW and laser welding are within the scope of the present disclosure. For example, metal inert gas (MIG) and tungsten inert gas (TIG) are known to those who are skilled in the metallurgical joining arts. Welding operation step 808 can include MIG or TIG welding that is configured to accommodate the welding of a flexible manifold to a heat exchanger core. Other welding processes are within the scope of the present disclosure. Moreover, multiple types of welding processes can be used in the metallurgical joining of flexible manifolds to a heat exchanger core in a particular embodiment, with non-limiting examples being a combination of EBW and laser welding.

The foregoing descriptions include the metallurgical joining of flexible manifolds to a heat exchanger core by using either brazing or welding, as depicted in FIGS. 7 and 8, respectively. In the exemplary embodiments described in the present disclosure, metallurgical bonds 50 shown in FIG. 5A were formed by welding, resulting in bonds that can be referred to as a butt joints, and metallurgical bonds 250 shown in FIG. 6 were formed by brazing, resulting in joints that can be referred to as a lap joints. It is to be appreciated that in other embodiments a butt joint can be formed by any metallurgical joining process (including brazing), and a lap joint can be formed by any metallurgical joining process (including welding). Moreover, utilizing multiple metallurgical joining processes for a particular heat exchanger is within the scope of the present disclosure. In an exemplary heat exchanger, the hot layers and cold layers can be of different sizes. Therefore, the individual layers of the hot flexible manifolds can be a different size from the individual layers of the cold flexible manifolds. In this exemplary embodiment, brazing can be used to join one set of flexible manifolds to the heat exchanger core, and welding can be used to join the other set of flexible manifolds to the heat exchanger core.

Discussion of Possible Embodiments

The following are non-exclusive descriptions of possible embodiments of the present invention.

A flexible manifold adapted for use on a plate-fin heat exchanger core, the flexible manifold comprising a plurality of individual layers, and further comprising: a first end with at least one port adapted to receive or discharge a medium; a second end distal from the first end, adapted to transfer the medium to or from the plurality of individual layers; a plurality of horizontal guide vanes defining the plurality of individual layers; and a plurality vertical members disposed within each of the individual layers; wherein: two adjacent horizontal guide vanes define an individual layer; the plurality of individual layers are configured to be metallurgically joined to respective ones of a plurality of layers of the plate-fin heat exchanger core; and the flexible manifold is configured to be mechanically and thermally compliant.

The flexible manifold of the preceding paragraph can optionally include, additionally and/or alternatively, any one or more of the following features, configurations and/or additional components:

A further embodiment of the foregoing flexible manifold, each of the plurality of layers of the plate-fin heat exchanger core including two parting sheets, each defining a parting sheet thickness, and two closure bars, each defining a closure bar thickness, wherein each of the plurality of individual layers includes a side wall defining a side wall thickness and a floor defining a floor thickness.

A further embodiment of the foregoing flexible manifold, wherein the side wall thickness is equal to the closure bar thickness.

A further embodiment of the foregoing flexible manifold, wherein the floor thickness is equal to the parting sheet thickness.

A further embodiment of the foregoing flexible manifold, comprising one or more of nickel, aluminum, titanium, copper, iron, cobalt, and alloys thereof.

A further embodiment of the foregoing flexible manifold, comprising Inconel 625, Inconel 718, Haynes 282, or AlSi10Mg.

A further embodiment of the foregoing flexible manifold, wherein each of the individual core layers is configured to matingly join respective ones of the plurality the individual layers, thereby forming a lap joint.

A further embodiment of the foregoing flexible manifold, wherein the vertical members comprise vertical guide vanes dividing each of the plurality of individual layers into a plurality of discrete manifold flow passages extending at least part of a distance from the first end to the second end of the flexible manifold.

A further embodiment of the foregoing flexible manifold, further comprising a plate-fin heat exchanger.

A method of forming a plate-fin heat exchanger having a heat exchanger core and at least one flexible manifold, the method comprising: forming the heat exchanger core, comprising a plurality of individual core layers; and metallurgically joining each of a plurality of individual layers of the at least one flexible manifold to respective ones of the plurality the individual core layers, thereby metallurgically joining the at least one flexible manifold to the heat exchanger core.

The method of the preceding paragraph can optionally include, additionally and/or alternatively, any one or more of the following features, configurations and/or additional components:

A further embodiment of the foregoing method, wherein the metallurgically joining comprises brazing.

A further embodiment of the foregoing method, wherein each of the individual core layers is configured to matingly join a respective one of the plurality the individual layers, thereby forming a lap joint.

A further embodiment of the foregoing method, wherein the brazing comprises bulk brazing, thereby brazing the heat exchanger core.

A further embodiment of the foregoing method, wherein the bulk brazing comprises the steps of: (a) positioning one or more flexible manifolds in contact with the heat exchanger core in a brazing furnace; (b) raising a temperature in the brazing furnace to at least a melting point of a brazing material; and (c) lowering the temperature in the brazing furnace to below the melting point of a brazing material.

A further embodiment of the foregoing method, wherein the metallurgically joining comprises welding.

A further embodiment of the foregoing method, wherein the welding comprises electron beam welding or laser welding.

A further embodiment of the foregoing method, wherein the at least one flexible manifold is produced by at least one of additive manufacturing, hybrid additive subtractive manufacturing, subtractive manufacturing, and casting.

A further embodiment of the foregoing method, wherein the at least one flexible manifold comprises Inconel 625, Inconel 718, Haynes 282, or AlSi10Mg.

A further embodiment of the foregoing method, further comprising additively manufacturing the at least one flexible manifold for the heat exchanger, including the steps of: additively building a housing for the first flexible manifold, within the housing, additively building a plurality of horizontal guide vanes defining the individual layers for at least a first medium, and additively building a plurality of vertical members within each of the individual layers.

A plate-fin heat exchanger, comprising: a plate-fin heat exchanger core; and a flexible manifold adapted for use on the plate-fin heat exchanger core, the flexible manifold comprising a plurality of individual layers, and further comprising: a first end with at least one port adapted to receive or discharge a medium; a second end distal from the first end, adapted to transfer the medium to or from the plurality of individual layers; a plurality of horizontal guide vanes defining the plurality of individual layers; and a plurality vertical members disposed within each of the individual layers; wherein: the plurality of individual layers are configured to be metallurgically joined to respective ones of a plurality of layers of the plate-fin heat exchanger core; and the flexible manifold is configured to be mechanically and thermally compliant.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flexible manifold adapted for connection to a plate-fin heat exchanger core, the flexible manifold comprising:
   a first end with at least one port adapted to receive or discharge a medium;
   a second end distal from the first end, adapted to transfer the medium to or from the plate-fin heat exchanger core, wherein the second end comprises a plurality of openings;
   a plurality of individual layers extending between the first end and the second end;
   a plurality of horizontal guide vanes defining the plurality of individual layers;

a plurality of manifold flow passages disposed within each layer of the plurality of individual layers and extending from the second end toward the first end;

a plurality of gaps extending completely through the flexible manifold and spacing each layer of the plurality of layers apart from one another such that each layer cantilevers toward the second end; and a plurality vertical members disposed within the plurality of individual layers;

wherein:

each layer of the plurality of individual layers is defined by two adjacent horizontal guide vanes of the plurality of horizontal guide vanes and is configured to be metallurgically joined to a respective core layer of the plate-fin heat exchanger core at an opening of the plurality of openings and form a lap joint with the respective core layer; and the two adjacent horizontal guide vanes are cantilevered with support proximate the first end, unsupported overhang extending towards the second end, and flexible to allow for elastic deformation.

2. The flexible manifold of claim 1, wherein the respective core layer of the plate-fin heat exchanger core comprises a parting sheet comprising a parting sheet thickness; and two closure bars, wherein each of the two closure bars comprises a closure bar thickness.

3. The flexible manifold of claim 2, wherein said each layer of the plurality of individual layers includes a side wall, defining a side wall thickness, and a floor defining a floor thickness.

4. The flexible manifold of claim 3, wherein the floor thickness is equal to the parting sheet thickness.

5. The flexible manifold of claim 1, comprising one or more of nickel, aluminum, titanium, copper, iron, cobalt, and alloys thereof.

6. The flexible manifold of claim 5, comprising Inconel 625, Inconel 718, Haynes 282, or AlSi10Mg.

7. The flexible manifold of claim 1, wherein the vertical members comprise vertical guide vanes dividing each of the plurality of individual layers into a plurality of discrete manifold flow passages extending at least part of a distance from the first end to the second end of the flexible manifold.

8. A plate-fin heat exchanger, comprising at least one of the flexible manifolds of claim 1.

9. A plate-fin heat exchanger, comprising:

a plate-fin heat exchanger core; and a flexible manifold adapted for use on the plate-fin heat exchanger core, the flexible manifold comprising a plurality of individual layers, and further comprising:

a first end with at least one port adapted to receive or discharge a medium;

a second end distal from the first end, adapted to transfer the medium to or from the plurality of individual layers, wherein the second end comprises a plurality of openings;

a plurality of horizontal guide vanes defining the plurality of individual layers;

a plurality of vertical members disposed within each layer of the plurality of individual layers;

a plurality of manifold flow passages disposed within each layer of the plurality of individual layers and extending from the second end toward the first end; and a plurality of gaps extending completely through the flexible manifold and spacing each layer of the plurality of individual layers apart from one another as each layer extends toward the second end;

wherein:

the plurality of individual layers are metallurgically joined at the second end to respective ones of a plurality of layers of the plate-fin heat exchanger core at the plurality of openings with a lap joint.

10. The flexible manifold of claim 3, wherein the side wall thickness is equal to the closure bar thickness.

* * * * *